Figure 1:
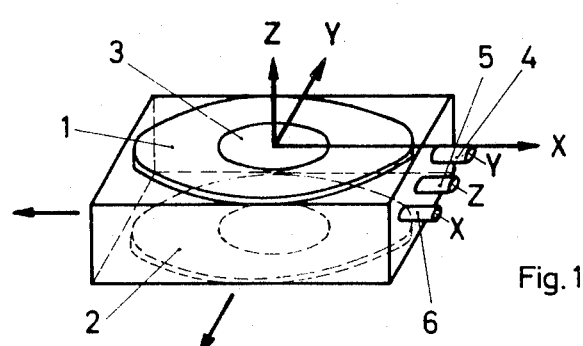

United States Patent

Spescha et al.

[15] 3,640,130
[45] Feb. 8, 1972

[54] FORCE AND MOMENT ARRANGEMENTS

[72] Inventors: Gelli Spescha; Karlheinz Martini, both of Winterthur; Hans Conrad Sonderegger, Neftenbach, all of Switzerland

[73] Assignee: Kistler Instrumente AG, Winterthur, Switzerland

[22] Filed: Oct. 30, 1969

[21] Appl. No.: 872,557

[30] Foreign Application Priority Data

Nov. 4, 1968   Switzerland ................... 16433/68

[52] U.S. Cl. ............................................ 73/133, 73/141 A
[51] Int. Cl. ................................................... G01l 5/12
[58] Field of Search ............... 73/141, 136, 133, 88.5, 147

[56] References Cited

UNITED STATES PATENTS

| | | | |
|---|---|---|---|
| 2,478,223 | 8/1949 | Argabrite | 73/133 |
| 2,898,477 | 8/1959 | Hoestery | 307/88.5 |
| 3,019,643 | 2/1962 | Curry | 73/147 |
| 3,151,258 | 9/1964 | Sonderegger | 310/8.7 |
| 3,269,175 | 8/1966 | Sprosty | 73/141 |
| 3,351,786 | 11/1967 | Muller et al. | 310/8 |
| 3,470,009 | 9/1969 | Weisbord | 310/15 |
| 3,095,735 | 7/1963 | Menzel | 73/147 |
| 3,241,360 | 3/1966 | Curry | 73/147 |
| 3,401,558 | 9/1968 | Stouffer et al. | 73/147 |
| 3,460,383 | 8/1969 | Padera | 73/147 |
| 3,474,237 | 10/1969 | Hastings | 235/151.3 |
| 3,490,059 | 1/1970 | Paulsen et al. | 73/133 |
| 3,513,300 | 5/1970 | Elfenbein et al. | 235/150.2 |

Primary Examiner—Richard C. Queisser
Assistant Examiner—John Whalen
Attorney—Craig, Antonelli and Hill

[57] ABSTRACT

A force and moment measuring arrangement comprises a measuring unit embodying a plurality of force-measuring cells and amplifier arrangements operatively connected thereto, the force-measuring cells being disposed in the measuring units in relation to ordinate axes in such manner that output signals which are obtained from said cells in response to forces and moments acting on the unit and which are applied to the amplifier arrangements produce output quantities which are proportional to individual force components and force moments. The force-measuring cells of a measuring unit may each be responsive in one or more component directions. Means are provided for eliminating interfering signals.

7 Claims, 10 Drawing Figures

PATENTED FEB 8 1972

3,640,130

SHEET 1 OF 4

$$M_z = \Sigma F \cdot a$$
$$M_z = \tfrac{1}{2}\left[A(\Sigma F_y) + B(\Sigma F_x)\right]$$

Inventors:
GELLI SPESCHA, KARLHEINZ MARTINI
and HANS CONRAD SONDEREGGER

BY Craig, Antonelli, Stewart & Hill
Attorneys

PATENTED FEB 8 1972

3,640,130

SHEET 3 OF 4

Inventors:
GELLI SPESCHA, KARL HEINZ MARTINI and
HANS CONRAD SONDEREGGER

BY Craig, Antonelli, Stewart & Hill
Attorneys

Inventors:
GELLI SPESCHA, KARLHEINZ MARTINI and
HANS CONRAD SONDEREGGER

BY Craig, Antonelli Stewart & Hill
Attorneys

FORCE AND MOMENT ARRANGEMENTS

This invention relates to arrangements for measuring forces and moments, and is more particularly concerned with arrangements by means of which forces and moments can be measured in a plurality of components thereof.

In many problems of the measuring technique one or more forces acting upon a test body must be divided into the individual component forces in relation to a coordinate system, and in many cases also the moments of such forces in relation to the test body must be determined. These are some of the most difficult problems of the measuring technique, and for years scientific papers have been published in the expert literature which deal with suitable measuring systems. In most cases, however, such measuring arrangements are extremely complicated and can be operated only by specialists. The reason for these difficulties resides in the fact that nearly all multiple-component force-measuring devices used heretofore are based on the use of strain gauges. However, it is extremely difficult to construct with this technique measuring elements which are sensitive in a plurality of force directions, because a perfect separation of the force directions in the strain gauge arms is difficult to attain. Moreover, a measuring system is produced thereby which must be elastic in various directions and thus leads to unavoidable mutual interference effects. Capacitive and inductive measuring systems are also unsuitable for multiple-component force-measurements, because these systems again must make use of elastic deformation which, in the case of application to multiple component measurements, again leads to unsatisfactory interference effects owing to mutual interaction between the individual components. Moreover such measuring arrangements attain only unsatisfactory natural frequencies because of the required elasticity.

Compared with the known prior art the multiple-component measuring arrangement according to the invention provides completely new possibilities for the first time. Use of new multiple-component measuring cells recently made commercially available by the applicants has made it possible to separate complicated force and moment effects upon a body to be investigated and to refer them to the desired coordinate axes and planes.

If for example, different forces affect a test body in totally different directions, the resultant total force is first divided spatially into coordinate forces, and thereafter the resultant force moments in the various coordinate planes are determined.

Referred to a conventional three coordinate system a force vector engaging a test point in any spatial relationship can be defined completely by its force components in the X, Y and Z axes as well as by the three resultant moments in the three coordinate planes. For the general case thus six measuring quantities are required which must be measured completely simultaneously, in particular when the vector changes in magnitude and direction with time, which is usually the case.

Figure 2:
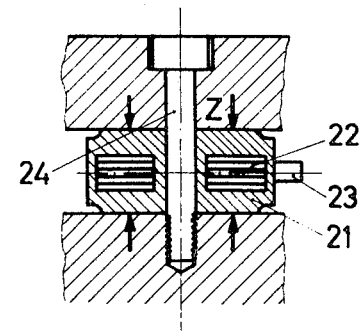
Figure 3:
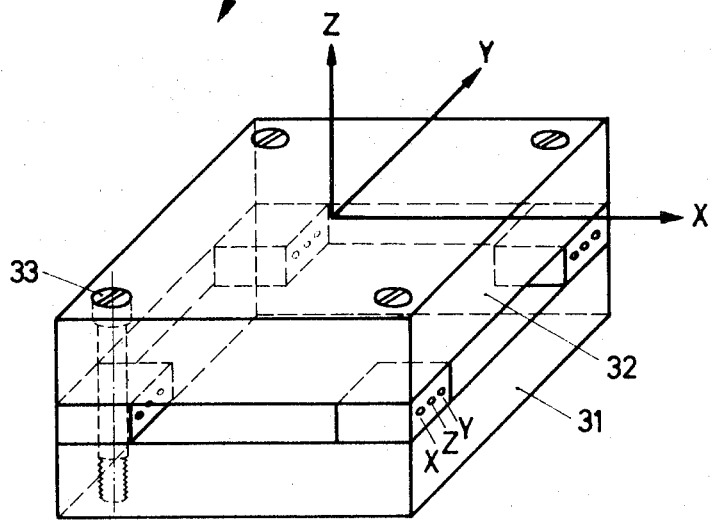
Figure 4:
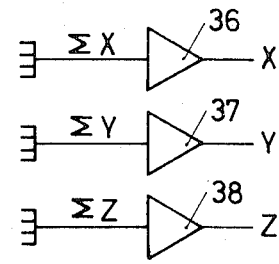
Figure 4:
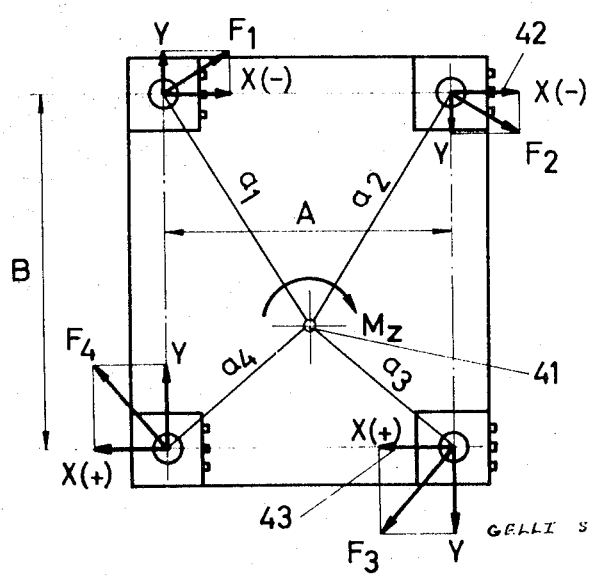
Figure 5:
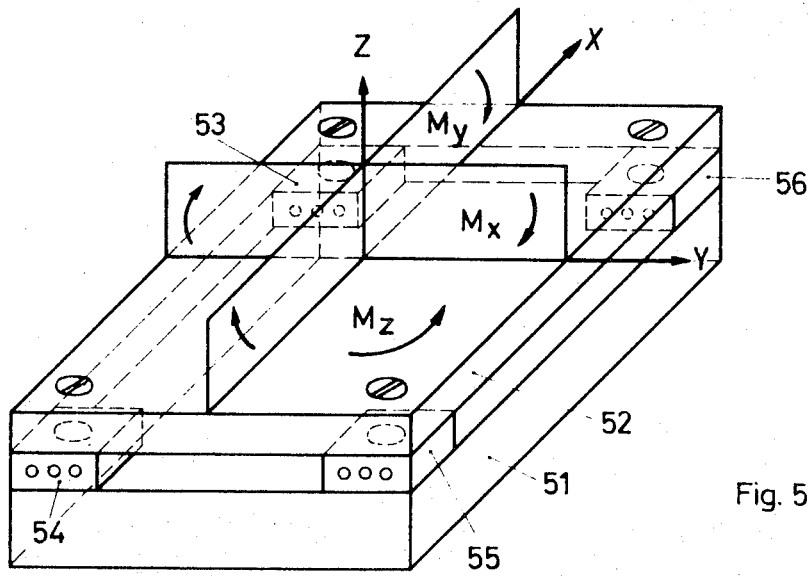
Figure 6:
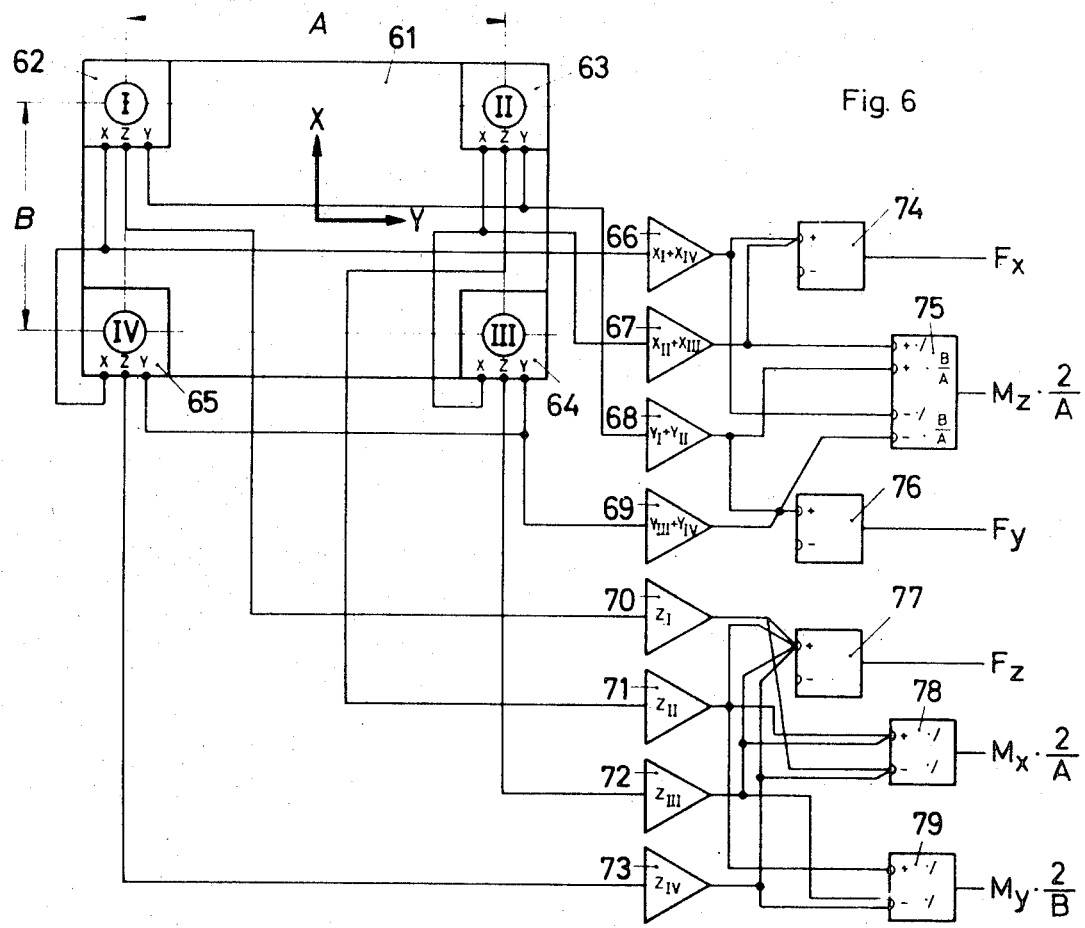
Figure 7:
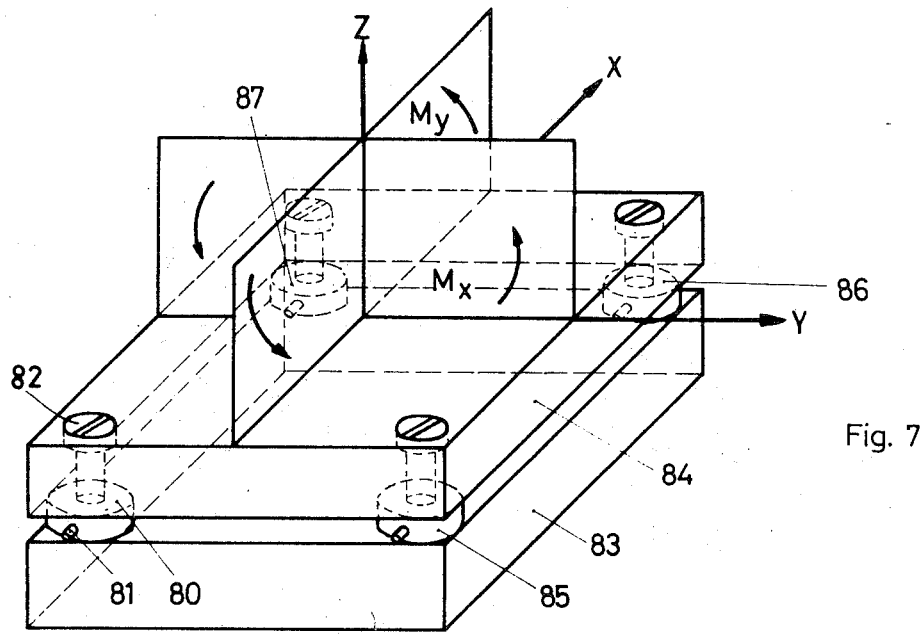
Figure 8:
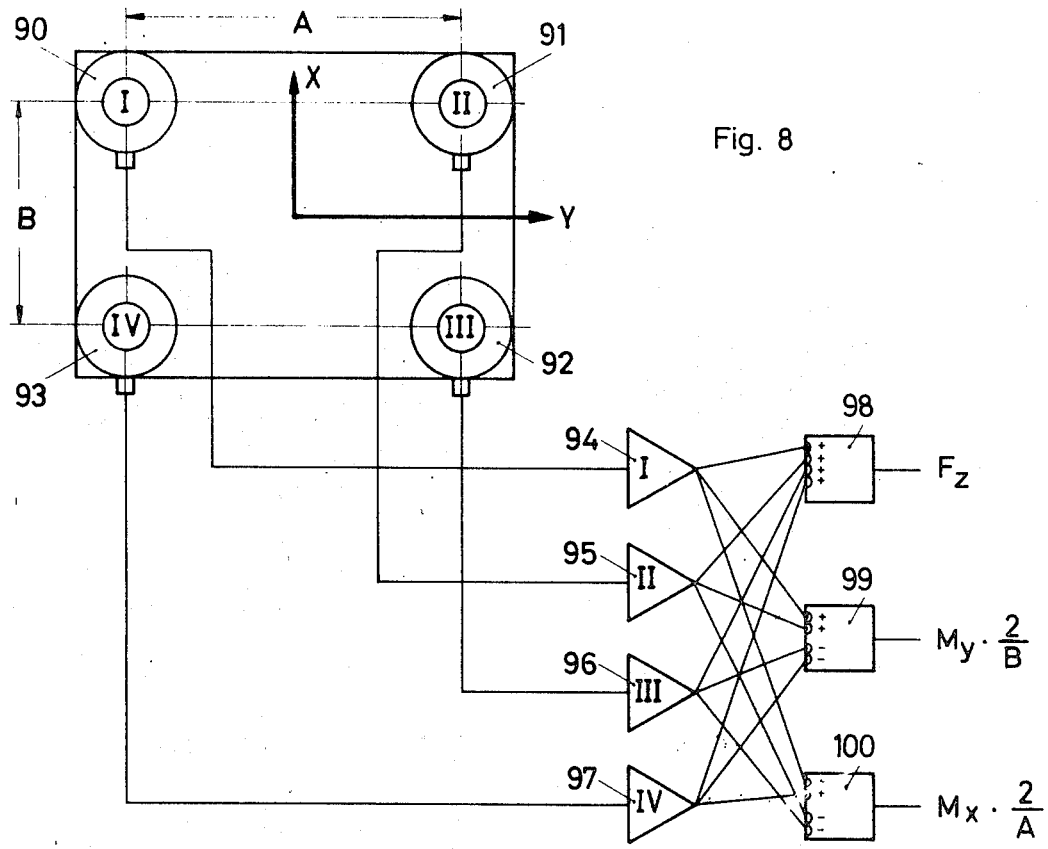
Figure 9:
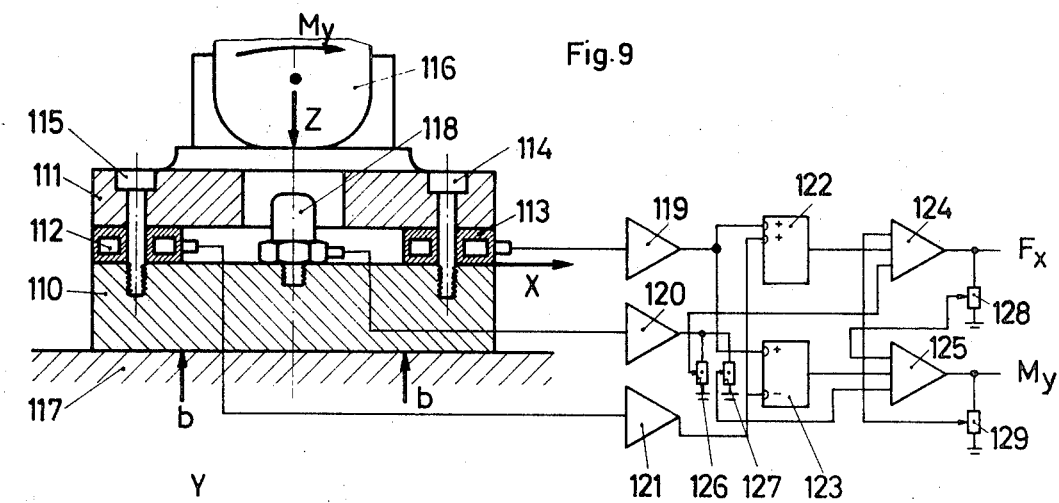
Figure 10:
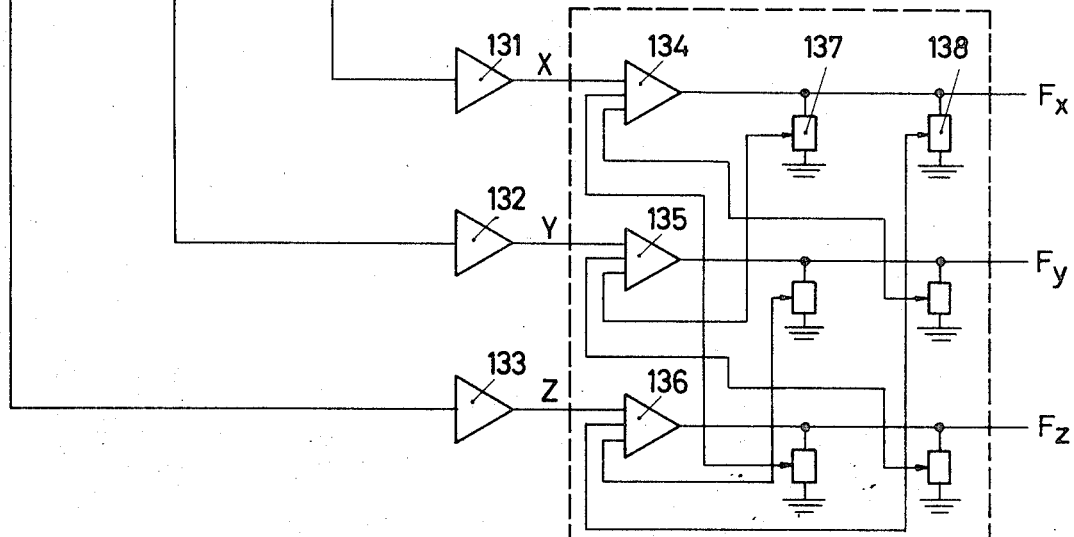

Several embodiments of the invention are described below by way of example with reference to the accompanying drawings, in which:

FIG. 1 is a perspective view of a multiple-component force-measuring cell recently made commercially available, FIG. 2 is a cross section through part of an assembly incorporating a multiple-component force-measuring cell, FIG. 3 illustrates a multiple-component measuring unit according to the invention constructed from four force-measuring cells, FIG. 4 is a ground plan of a multiple-component measuring cell unit illustrating the force relationship when a torque is applied, FIG. 5 illustrates a multiple-component measuring unit which is engaged by moments in three different planes, FIG. 6 is a circuit arrangement for measuring individual forces as well as moments which engage the measuring unit of FIGS. 5 and 3, FIG. 7 illustrates a measuring unit incorporating four commercial single-components force-measuring cells, FIG. 8 is a circuit arrangement for a measuring unit according to FIG. 7, by means of which a force and two moments can be measured, FIG. 9 illustrates a measuring unit in which two force-measuring cells as well as an acceleration-measuring cell are arranged in such manner that acceleration effects are balanced out, and FIG. 10 is a circuit arrangement for a measuring unit consisting of four multiple-component measuring cells, whereby any cross effects on individual components can be compensated.

The ideas of the invention are now to be described in detail with reference to the figures. In all examples piezoelectric measuring cells are illustrated; however, the invention is not restricted to the use of this kind of cell.

FIG. 1 illustrates a multiple-component force-measuring cell of the type disclosed in U.S. Pat. No. 3,566,163, which has just become commercially available. Force components are arranged to engage an upper receiving surface 1 and a lower receiving surface 2. In order that forces in the X and Y directions can be transmitted to these two surfaces, it is necessary that the measuring cell is assembled in such manner that it is subjected to mechanically produced stress. For this purpose the measuring cell is provided with an opening 3 therethrough through which appropriate stressing screws can extend. The measuring signals are taken off connector terminals 4, 5 and 6.

FIG. 2 illustrates by way of example the assembly of a multiple-component force-measuring cell. The measuring cell has a body 21, an element 22 which is sensitive in various axes, and connector means 23. For transmitting shear forces a stressing screw 24 is arranged to provide a large mechanically produced stress. This stressing screw must be made as elastic as possible in order that it does not take part in the transmission of the forces to any appreciable extent, i.e., that the forces are guided mainly through the sensitive measuring element 22.

FIG. 3 illustrates a measuring unit which includes four multiple-component measuring cells. These cells are rigidly fixed by means of stressing screws 33 between a baseplate 31 and a cover plate 32. The cover plate 32 serves for supporting the test object which is to be investigated and at which forces effects are to be measured in the direction of three force components. In a case in which only three force components are of interest a simple circuit is satisfactory in which all X outputs of the individual cells are connected together and are guided through an amplifier 36. All Y outputs and Z outputs of the individual multiple-component measuring cells are treated in a similar manner and are connected to amplifiers 37 and 38 respectively. The signals X, Y and Z obtained at the respective outputs can then be treated further. Measuring units of this kind are useful mainly in respect of metal-cutting techniques in which the reaction forces of various machining processes are to be investigated. For many such applications it is sufficient that a simple measuring unit is available which is completely rigid and thus has a high natural frequency, and which can be calibrated conveniently in three axes.

However, if in a similar case moments occur which are to be measured, further factors must be taken into account.

FIG. 4, is a plan of a measuring unit which comprises four multiple-component measuring cells. It is assumed that a rotary moment M engages the upper mounting plate in the plane of the plan. The distance between the centers of the four cells are denoted by A and B. If the moment engages anywhere in the plane, e.g., at a point 41, there result in respect of the four cells four individual forces F1 to F4 spaced from the cells by distances $a1$ to $a4$ respectively. The total moment $Mz$ is thus equal to the sum of all individual moments;

$$Mz = \sum F \times a$$

When these forces are divided into their components and the distances are replaced by the ordinate spacings A, B of the measuring cell centers, the above formula can be reduced to the simple expression:

$$Mz = \tfrac{1}{2}[A(\Sigma Fy) + B(\Sigma Fx)]$$

wherein the signs of the forces have to be taken into account. Thus, since the axis spacings A, B as well as all X and Y components are known, any moment M in the plane X and Y can be perfectly defined. A condition is that the polarity of the cell output signals is direction-dependent in order that the directions of the force vectors can be defined unambiguously. This is indicated for the vectors 42 and 43 both of which act in the X direction which however have different signs and therefore must produce different output signals, namely positive and negative output signals.

The idea of the moments is carried still further in FIG. 5. In the measuring unit illustrated therein four multiple-component measuring cells are rigidly secured by screws between a baseplate 51 and a cover plate 52. The measuring cells are disposed symmetrically in relation to the selected X and Y axes of the measuring system. Torques engage the cover plate 52 in three planes. The torque Mz in the base plane produces shear forces as illustrated in FIG. 4. The torque My in the illustrated effective direction produces load-increasing forces on the cells 53, 56 and load-reducing forces on the cells 54, 55. A similar effect is produced by a torque Mx in the illustrated rotary direction, but in this case the load on the cells 53 and 54 is reduced and the load on the cells 55 and 56 is increased. The three individual force components mentioned in FIG. 3 may be added without difficulty to these three moments, so that for the general case three force components as well as three force moments can be measured simultaneously with the same measuring unit. If, a test object is mounted on the measuring plate 52, any individual force which acts upon the test object can be defined completely from the six components. Owing to the fact that very rigid cells are secured together such as by screws to form a unit which is also rigid, a measuring system is obtained which is suitable for a wide range of force measurements because it has high natural frequencies in all directions.

FIG. 6 is a block diagram of a circuit arrangement necessary for the general case just discussed. The multiple-component measuring cells 62, 63, 64 and 65 are again disposed symmetrically in relation to the selected X and Y axes. The spacing of the elements in the Y direction is denoted by A, the spacing of the elements in the X direction is denoted by B. The output signals of the individual cells are applied to a group of 8 preamplifiers 66, 67, 68, 69, 70, 71, 72 and 73. The amplifiers 66, 67 and 68, 69 receive respectively the combined output signals of two X outputs and two Y outputs. The individual outputs of the Z components are applied to the amplifiers 70, 71, 72 and 73. The outputs of these preamplifiers are connected to a group of operational amplifiers 74, 75, 76, 77, 78 and 79. These operational amplifiers effect the addition and subtraction of the various prepared signals. At the output of the operational amplifier 74 there appears a signal representing the force component Fx in the X direction, the signal being proportional to the algebraic sum of all X components of the four cells. The operational amplifier 76 is arranged similarly and delivers a signal representing the algebraic sum of all Y components of the four cells. The operational amplifier 77 performs the same operation for all Z components of the four measuring cells. In the operational amplifier 75 the moment Mz in the XY plane is determined by processing all X and all Y components, the spacing A being included at the same time in the output as a factor. Similar operations are performed by the operational amplifiers 78 and 79 which deliver the moments in the respective XZ and YZ planes, again multiplied by the associated axis-spacing factor. Thus the three individual components as well as the three moments are obtained by this arrangement completely separate from each other. Preferably the signals are treated further in a multiple-channel recorder.

With reference to FIGS. 5 and 6 the main idea of the invention relates to a measuring system in which all effects are to be referred to the three coordinate axes X, Y and Z. Accordingly the individual multiple-component measuring cells are disposed in relation to these selected axes. In the illustrated case the engagement points are referred to a rectangle. However, it is possible without difficulty and even simpler to arrange the engagement points in a square. Furthermore it is also possible for the engagement points to become effective in any other geometrical arrangement, e.g., an equilateral triangle. In place of the conventional X, Y, Z coordinate system the individual coordinates of which are spatially displaced by 90°, it is also within the scope of the invention to use a different coordinate system the individual coordinates of which are in any other angular relationship. The individual multiple-component measuring cells must then be arranged accordingly.

Also it is clearly obvious from the general arrangement of FIG. 6 that a very practical arrangement can be constructed in such manner that apart from the three force components only moments in the XY plane, that is to say Mz moments, are measured. Such a measuring unit is suitable in particular for metal treatment tests in which grinding, milling and drilling experiments are to be carried out. Such an arrangement requires only five preamplifiers instead of the eight preamplifiers provided in FIG. 6, and in place of the six operational amplifiers only three amplifiers are necessary. The expenditure for such an arrangement is therefore considerably lower.

FIG. 7 illustrates a simpler measuring problem in which two moments and a resultant force are to be measured. For such a problem four standard force-measuring cells such as commercially available may be used. Each of these cells 80 has an output 81. The cells are rigidly secured by means of screws 82 between a baseplate 83 and a cover plate 84. Their arrangement is again symmetrical with respect to the X and Y axis. A moment Mx which is operative in the Y and Z plane produces a load reduction of the cells 85 and 86 and a load increase of the cells 83 and 87. The moment My which is effective in the XZ plane produces in the illustrated effective direction a load increase of the cells 80 and 85 and a load reduction of the cells 86 and 87.

FIG. 8 illustrates a circuit arrangement which makes use of a measuring unit corresponding to FIG. 7. The four single-component measuring cells 90, 91, 92 and 93 have axis spacings A and B and are disposed symmetrically in relation to the X and Y axes.

The outputs of the four cells are applied individually to the four preamplifiers 94, 95, 96 and 97. The operational amplifier 98 sums all output signals of the preamplifiers and thus indicates the total resulting force Fz. In the operational amplifier 99 the outputs of the groups of cells disposed symmetrically to the Y axis are converted by reversing amplifiers to a voltage corresponding to Force=My x(2/B)

In a similar manner the outputs of the groups of the cells disposed symmetrically to the X axis are treated in the operational amplifier 100 to yield a voltage corresponding to Force =Mx x (2/A)

These forces are with the appropriate factors proportional to the moments to be measured. Thus a force and two moments are available for further treatment in the indicating apparatus or recorder.

The use of only single-component measuring cells permits also without difficulty an arrangement in which the measuring cells disposed in a square or a triangle or any other geometrical figure, in place of the arrangement in a rectangle. Because of the rigidity of the cells the cells can also be assembled not only in one plane but in two or more planes which are in mutually different angular positions. In this manner single-component measuring cells permit the measurement of forces in a plurality of components thereof. The arrangement however becomes complicated and expensive to produce, the main reason for which is that the cells must have exactly the same assembly dimensions for each plane.

In various application problems wherein multiple-component force and moment measurements are to be carried out vibrations and thus acceleration conditions occur simultaneously with the engaging forces. This is frequently the case when the supporting plate on which the multiple-component measuring unit is mounted does not possess a very great mass. Owing to the occurrence of vibrations, acceleration forces are produced which bring about in certain cases a falsification of the force vectors actually present. In such cases, an attempt must be made to eliminate the error signals produced by the acceleration forces.

An example of such an arrangement is illustrated in FIG. 9, wherein acceleration forces in one axis are to be compensated. However, there is no difficulty to compensate also acceleration forces in a plurality of components, this however causing a correspondingly increased expenditure for signal processing apparatus. Two measuring cells 112 and 113 are rigidly mounted by means of screws 114 and 115 between a baseplate 110 and a cover plate 111. The two cells are sensitive in the direction of the Z axis. A test structure 116 is mounted on the cover plate 111 and may be, for example, a rocket chamber. The baseplate 110 in turn is mounted on a frame 117 which may receive from adjacent test apparatus or the like, vibrations which produce an acceleration $b$ of the whole measuring unit in the direction of the Z axis. The force and the moment caused by the combustion process of the rocket and measured by the two cells 112 and 113 are falsified by this vibration. Therefore the magnitude of the acceleration must be measured and its product the resultant force $Fb$ = mass of the test structure multiplied by the acceleration, as well as the moment corresponding to the position of the center of gravity, must be deducted from the total measured force and the moment of the two cells. This process is effected by an arrangement of preamplifiers and operational amplifiers. The signals which originate from the two force-measuring cells 112, 113 and an acceleration transmitter 118 are amplified in preamplifiers 119, 120 and 121. The sum of the two force signals is formed in an operational amplifier 122 which delivers an output the magnitude of which is proportional to the total force. An operational amplifier 123 forms the difference between the two force signals so that the output signal thereof is proportional to the moment My. The two output signals thus obtained are applied to respective amplifiers 124, 125 each of which passes the respective signal on without change, but which is provided with additional positive and negative inputs for the insertion of correction signals. The quantity required for acceleration compensation is taken off potentiometers 126 and 127 which are supplied by the amplifier 120 and is applied to the addition or subtraction input of the amplifiers 124 and 125. Similarly, cross effects on the two measuring channels caused by a not ideal test or measuring setup are compensated in that the appropriate quantities are taken off potentialometers 128 and 120 and are supplied to the addition or subtraction input of the amplifiers 124 and 125.

In the performance of multiple-component and multiple-moment measurements, in practice frequently a further problem occurs, namely the problem of cross effect or "cross-talk." This difficulty is mainly caused by fastening effects between the baseplate and the cover plate and the individual measuring cells. The disturbance or interference is noted when calibration of a finished assembled measuring unit is to be effected and calibration forces are applied in defined axes to the measuring unit. If, e.g., the Z direction is loaded, an error signal may be detected in the X-component and/or in the Y-component direction. It may be desirable in many cases that these error signals can be compensated in the finished assembled measuring arrangement. A compensation circuit for this purpose requires a group of operational amplifiers with appropriate balancing resistors. Without difficulty forces as well as moments can be completely compensated with such a circuit.

With reference to the example illustrated in FIG. 10 compensation only of the forces in the three coordinate axes is to be described for reasons of simplicity. Again a measuring unit consisting of four multiple-component measuring cells is assumed. Because only forces are to be measured, the individual X connections can be joined and applied together to an amplifier 131. The same applies to the Y connections which are also connected together to an amplifier 132, as well as to the Z connections which are applied to an amplifier 133. An operational amplifier 134 can then be supplied with compensation values X derived respectively from the Y and Z signals. If for example a calibration force of 100 kp is applied only in the X axis, signals may appear, because of the mentioned interference effects, also at the outputs Fy and Fz which falsely indicate the presence of forces in the Y and Z directions. Because the mechanical couplings causing these effects behave linearly in a first approximation, they can be compensated by means of the operational amplifiers 134, 135 and 136 as follows.

If a signal corresponding to for example minus 5 kp appears at the output of the Y channel, a voltage which corresponds to the value 5 kp is taken off the potentiometer 137 and is applied to the positive (adding) input of the operational amplifier 135. Thereby the signal Fy drops to zero. An interferring signal of for example plus 7 kp at the output Fz is compensated in that a corresponding voltage is taken off the potentiometer 138 and applied to the negative (subtracting) input of the operational amplifier 136.

It may be seen from the circuit arrangement that in this manner simple means permit to compensate completely to zero interference effects of the adjacent outputs in each of the three outputs. A condition for this is that a perfect calibrating device is available by means of which successively forces can be applied in the three axes.

Thus the invention permits to solve multiple-component force and moment problems with completely new arrangements. A condition for the perfect performance of such complicated measurements is a highly accurate assembly of very rigid measuring cells in accordance with the requirements of the desired ordinate directions. Piezoelectric measuring cells have been found advantageous for these measurements. The idea of the invention however is not restricted to the manner of construction of the measuring cell, but it is of importance that the measuring cells are very rigid and ensure a perfect internal separation of the forces according to ordinate directions.

For forming a measuring unit, the measuring cells are usually arranged in one plane. However, it is also possible to secure the cells in two or more planes completely rigidly. It is advantageous when for these arrangements measuring cells with central openings are used, whereby simple and clear assembly conditions are obtained. The circuit arrangement of preamplifiers and operational amplifiers associated with the arrangement of the measuring cells depends entirely upon the desired evaluation range. The circuit arrangements illustrated make possible for the first time a completely defined measurement of forces and moments thereof. Furthermore, the necessary steps are indicated in order to compensate acceleration forces which may occur, as well as to compensate also errors caused by the mounting of the individual measuring cells and arising from mutual interference between individual components. Therefore measuring problems can be solved with the arrangements provided by the invention for which heretofore no practicable means were available.

What is claimed is:

1. A measuring arrangement for determining forces and moments acting upon a test body to which said arrangement is to be affixed, so that said forces and moments will be imparted thereto, said arrangement comprising:

a pair of force transmission plates and a plurality of force-measuring cells composed of piezoelectric crystals of the type which are sensitive to force components in a plurality of directions rigidly secured between said plates and arranged in a predetermined spaced-apart relationship relative to a set of three coordinate axes so as to be sensitive to a moment acting about a definable point on at least one of said plates relative to the other of said pair of force transmission plates;

means for generating a signal representative of the components of forces along said axes applied to said measuring cells comprising a plurality of preamplifiers, connected to said force-measuring cells within said plurality; and means for generating signals representative of the individual force components along said coordinate axes and moments about said point applied to said at least one of said plates comprising a plurality of operational amplifiers connected to selected ones of preamplifiers, wherein the outputs of said measuring cells provide electrical signals the polarity of which is indicative of the sense of said components acting upon said unit with respect to said axes, so that said forces and moments may be determined.

2. An arrangement according to claim 1, wherein means are provided for mechanically prestressing said piezoelectric crystals between said plates.

3. An arrangement according to claim 1, wherein the coordinate axes are designated by respective X, Y and Z mutually orthogonal axes and wherein pairs of individual outputs of said measuring cells represent said components along the X axes and said components along the Y axes are connected together, said connected outputs being connected together, said connected outputs being connected to a first set of said preamplifiers, and wherein each measuring cell output which represents components along the Z direction is connected to a respective individual preamplifier separate from said first set of preamplifiers and further including means comprising a group of operational amplifiers connected to said plurality of preamplifiers for generating the signals proportional to the individual force components acting along said respective axes and moment components about said definable point.

4. An arrangement according to claim 1, wherein said coordinate axes are designated by respective X, Y and Z orthogonal components and wherein said plurality of measuring cells comprise four multiple-component measuring cells, the center of said cells disposed in pairs symmetrical to said respective X and Y axes and wherein all four Z-output connections of said measuring cells are connected together and wherein two Z and two Y connections are connected in pairs to five initial amplifiers and thereafter to three operational amplifiers, whereby three force components and one moment in the X-Y plane can be measured.

5. An arrangement according to claim 1, wherein said measuring cells within said measuring unit comprise a symmetrical arrangement of a plurality of single-component force-measuring cells for detecting an applied moment and wherein each of the outputs of said cells are connected to a respective preamplifier, the respective preamplifier outputs being connected in groups to said operational amplifiers for generating output signals representative of the sum of individual forces and moments applied to said at least one of said plates of said arrangement.

6. An arrangement according to claim 1, wherein said measuring units include at least one acceleration-responsive means and an acceleration preamplifier and operational amplifier connected thereto for amplifying the output of said means for providing an error signal representative of acceleration forces caused by the displacement of said measuring unit and means for combining the outputs of said plurality of operational amplifiers with said acceleration operational amplifier for compensating for the moments produced by said acceleration forces.

7. An arrangement according to claim 1, further including means for compensating the outputs of said signal-generating means for the interfering influence of the individual force components along said axes, comprising a group of compensating operational amplifiers connected to receive individual sets of the outputs of said plurality of preamplifiers, whereby the outputs of said group of compensating operational amplifiers will provide signals representative of only those force components corresponding to a particular coordinate axis.

* * * * *